US009964154B2

(12) United States Patent
Daining et al.

(10) Patent No.: US 9,964,154 B2
(45) Date of Patent: May 8, 2018

(54) DRIVE ARRANGEMENT FOR DIRECT DRIVE ROTOR

(71) Applicant: Vermeer Manufacturing Company, Pella, IA (US)

(72) Inventors: Stephen Daining, Pella, IA (US); Jacob B. Martin, Des Moines, IA (US); Jim O'Halloran, Pella, IA (US); Christopher A. Pfoltner, Knoxville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 613 days.

(21) Appl. No.: 14/554,979

(22) Filed: Nov. 26, 2014

(65) Prior Publication Data

US 2015/0250087 A1    Sep. 10, 2015

Related U.S. Application Data

(60) Provisional application No. 62/014,226, filed on Jun. 19, 2014, provisional application No. 61/949,827, filed on Mar. 7, 2014.

(51) Int. Cl.
*A01D 34/835* (2006.01)
*F16D 1/06* (2006.01)
*A01G 23/00* (2006.01)
*F16D 1/10* (2006.01)

(52) U.S. Cl.
CPC ........... *F16D 1/06* (2013.01); *A01D 34/8355* (2013.01); *A01G 23/00* (2013.01); *F16D 1/101* (2013.01); *F16D 2001/062* (2013.01); *F16D 2001/102* (2013.01); *Y10T 403/32983* (2015.01)

(58) Field of Classification Search
CPC .... A01G 23/00; A01D 34/8355; A01D 34/42; A01D 45/00; A01D 69/00; A01D 69/005; A01D 69/02; A01D 69/025; A01D 82/00; E02F 3/246
See application file for complete search history.

(56) References Cited

U.S. PATENT DOCUMENTS

| 5,794,866 A * | 8/1998 | Shinn .................... A01G 23/093 |
| | | 144/24.12 |
| 6,438,874 B1 * | 8/2002 | LaBounty ................. E02F 3/20 |
| | | 144/24.12 |
| 7,748,421 B2 * | 7/2010 | Everett .................. A01G 3/002 |
| | | 144/172 |

(Continued)

FOREIGN PATENT DOCUMENTS

WO    WO 9504191 A1 *  2/1995  ........... E01C 23/088

OTHER PUBLICATIONS

IronWolf Mulcher Series Brochure, 2009.

*Primary Examiner* — Matthew D. Troutman
(74) *Attorney, Agent, or Firm* — Merchant & Gould P.C.

(57) ABSTRACT

A direct drive system is provided for supporting and driving a rotor. The drive system includes a support body and a drive hub assembly, which are modularized respectively and assembled together to produce the drive system. The support body has a body wall extending between opposite ends. One of the ends has an interior surface and an exterior surface. The drive hub assembly is mounted onto the exterior surface of the end of the support body. The motor mounts so as to be position primarily in an interior of the support body.

20 Claims, 14 Drawing Sheets

(56) References Cited

U.S. PATENT DOCUMENTS

| | | |
|---|---|---|
| 7,980,278 B2 | 7/2011 | Labbe |
| 2002/0192025 A1 | 12/2002 | Johnson |
| 2005/0103947 A1 | 5/2005 | Beller |
| 2009/0044508 A1* | 2/2009 | Labbe .................... A01G 23/00 56/252 |
| 2014/0212212 A1 | 7/2014 | Isley |
| 2014/0231565 A1* | 8/2014 | Labbe .................... A01G 23/00 241/277 |

* cited by examiner

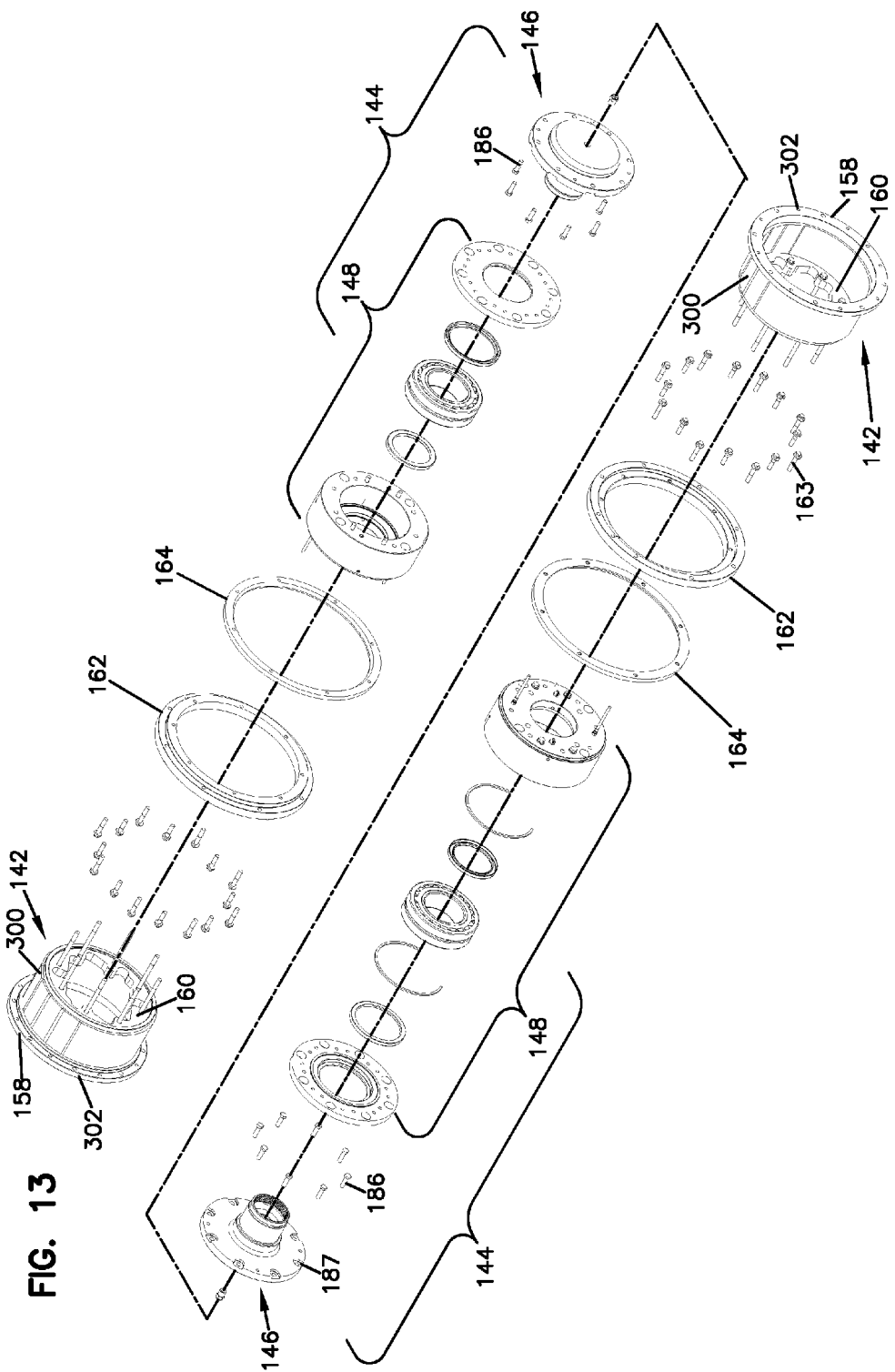

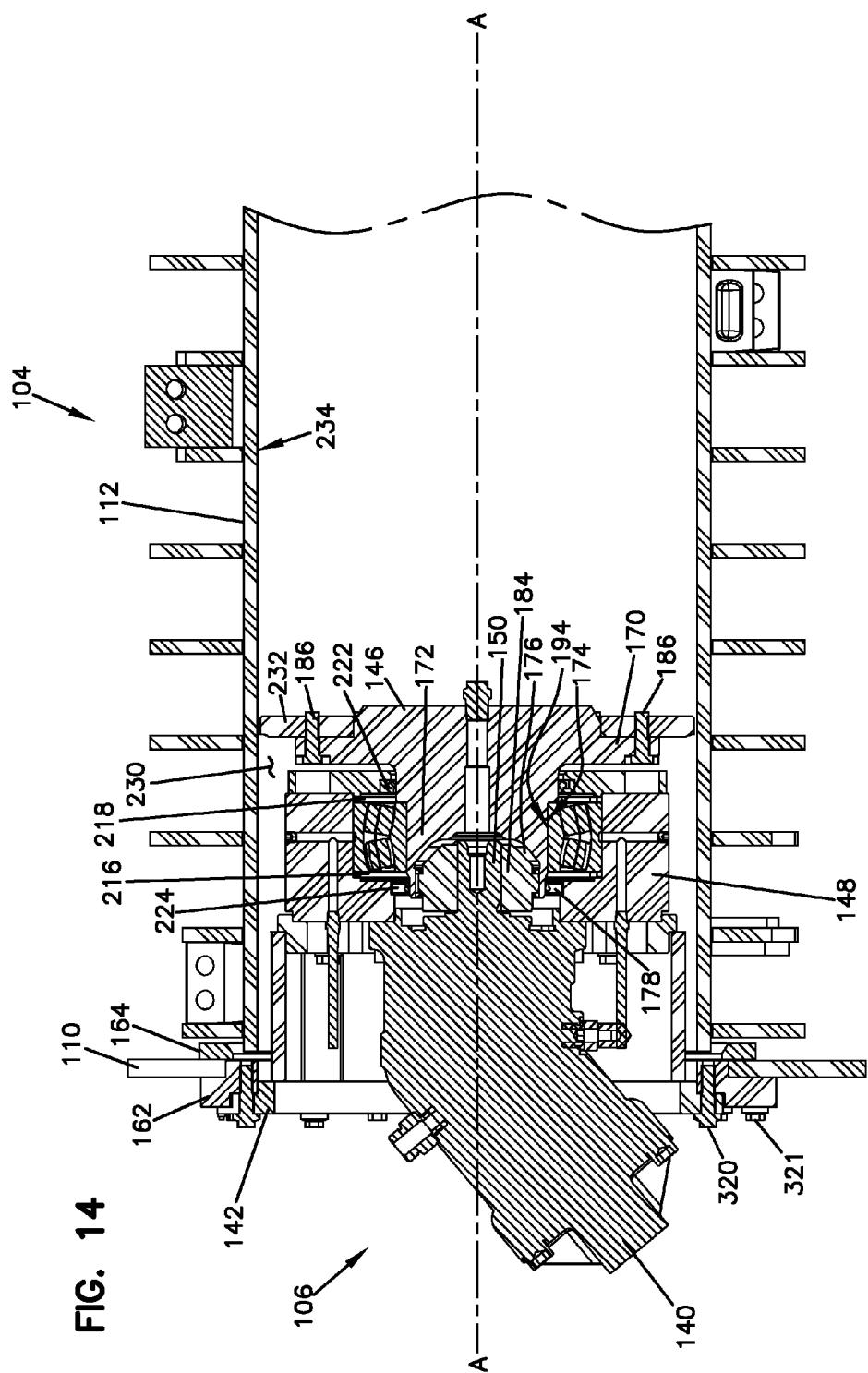

DRIVE ARRANGEMENT FOR DIRECT DRIVE ROTOR

CROSS REFERENCE TO RELATED APPLICATIONS

This application claims the benefit of U.S. patent application Ser. No. 62/014,226 filed on Jun. 19, 2014 and U.S. patent application Ser. No. 61/949,827 filed on Mar. 7, 2014. The entireties of these applications are hereby incorporated by reference.

BACKGROUND

Several types of drive systems have been introduced to drive rotors or rotating members, such as cutter heads. The drive systems for such rotors typically include a series of pulleys and belts for rotating the rotors. Rotation may be driven by hydraulic motors or any other suitable driving systems In some applications, direct drive mechanisms are used to operate rotor assemblies and reduce the number of power transmission elements, thereby minimizing the size of the drive systems and improving the reliability of the drive systems. However, because the direct drive systems need to be arranged adjacent the rotor assemblies to directly transfer torque to the rotor assemblies, space management and access issues can make designing such systems difficult.

SUMMARY

In general terms, this disclosure is directed to a direct drive system for supporting and driving a rotor. In one possible configuration and by non-limiting example, the drive system includes a support body and a drive hub assembly, which are modularized respectively and assembled together to produce the drive system. Various aspects are described in this disclosure, which include, but are not limited to, the following aspects.

One aspect is a drive system for rotationally driving a rotor relative to a main body, which includes a support body, a rotor drive shaft, and a bearing assembly. The support body extends between first and second ends. The first end is configured to be mounted to the main body. The second end has an interior surface and an exterior surface. The rotor drive shaft can include a rotor support portion and a shaft portion. The rotor support portion is configured to be coupled to the rotor. The shaft portion is configured to be driven by a drive shaft of a motor. The bearing assembly is mounted onto the exterior surface of the second end of the support body and rotatably supporting the shaft portion of the rotor drive shaft. The motor mounts adjacent to the interior surface and is primarily located within an interior of the support body.

The support body may include a cylindrical main wall, a first flange, a second flange, and a hollow. The cylindrical main wall extends between the first and second ends. The first flange is arranged at the first end and configured to be mounted to the main body. The second flange is arranged at the second end and has the interior surface and the exterior surface. The exterior surface is configured to engage the bearing assembly. The hollow is open to the first and second ends and configured to receive the motor from the first end. The interior surface of the second flange faces the hollow and the second flange is configured to allow at least a portion of the motor to pass therethrough.

Another aspect is a cutter head system including a body, a rotor assembly, and a drive system. The rotor assembly is at least partially received in the body. The drive system is configured to rotationally support and drive the rotor assembly. The drive system may include a motor, a support body, a rotor drive shaft, and a bearing assembly. The motor has a drive shaft. The support body extends between first and second ends. The first end is mounted to the body. The second end has an interior surface and an exterior surface. The rotor drive shaft includes a rotor support portion and a shaft portion. The rotor support portion is coupled to the rotor assembly, and the shaft portion is configured to be driven by the drive shaft of the motor. The bearing assembly is mounted onto the exterior surface of the second end of the support body and rotatably supporting the shaft portion of the rotor drive shaft. The second flange defines an opening through which at least a portion of the motor extends.

Yet another aspect is a drive system that rotationally drives a rotor relative to a main body and includes a motor, a support body, and a drive hub assembly. The rotor has an inner bore configured to at least partially receive the drive system therein and has an inner drive flange circumferentially extending from an inner surface of the inner bore. The motor has a drive shaft. The support body may include a cylindrical main wall, a first flange, and a second flange. The cylindrical main wall extends between a first end and a second end opposite to the first end along a longitudinal axis A. The main wall defines an interior hollow within the main wall. The first flange is provided at the first end. The first flange extends radially outwardly from the first end and configured to be mounted to the main body. The second flange is provided at the second end. The second flange extends radially inwardly from the second end and partially encloses the hollow at the second end. The second flange has an outboard side facing the hollow and an inboard side opposite to the outboard side. The motor mounts within the hollow. The drive hub assembly may include a bearing assembly and a rotor drive shaft. The bearing assembly includes a drive bearing and a bearing housing. The drive bearing has an inner race and an outer race. The bearing housing contains the drive bearing and is mounted onto the inboard side of the second flange of the support body. The rotor drive shaft includes a rotor support flange and a shaft portion. The rotor support flange is coupled to the inner drive flange of the rotor. The shaft portion has an outer shaft surface and an inner shaft bore. The outer shaft surface engages the inner race of the drive bearing, and the inner shaft bore couples to the drive shaft of the motor.

BRIEF DESCRIPTION OF THE DRAWINGS

FIG. 13 is an exploded view of the support body and the drive hub assembly of FIGS. 7-12.

FIG. 14 is a cross-sectional view of the drive system of FIGS. 4-12 with the rotor assembly assembled.

DETAILED DESCRIPTION

Figure 1:
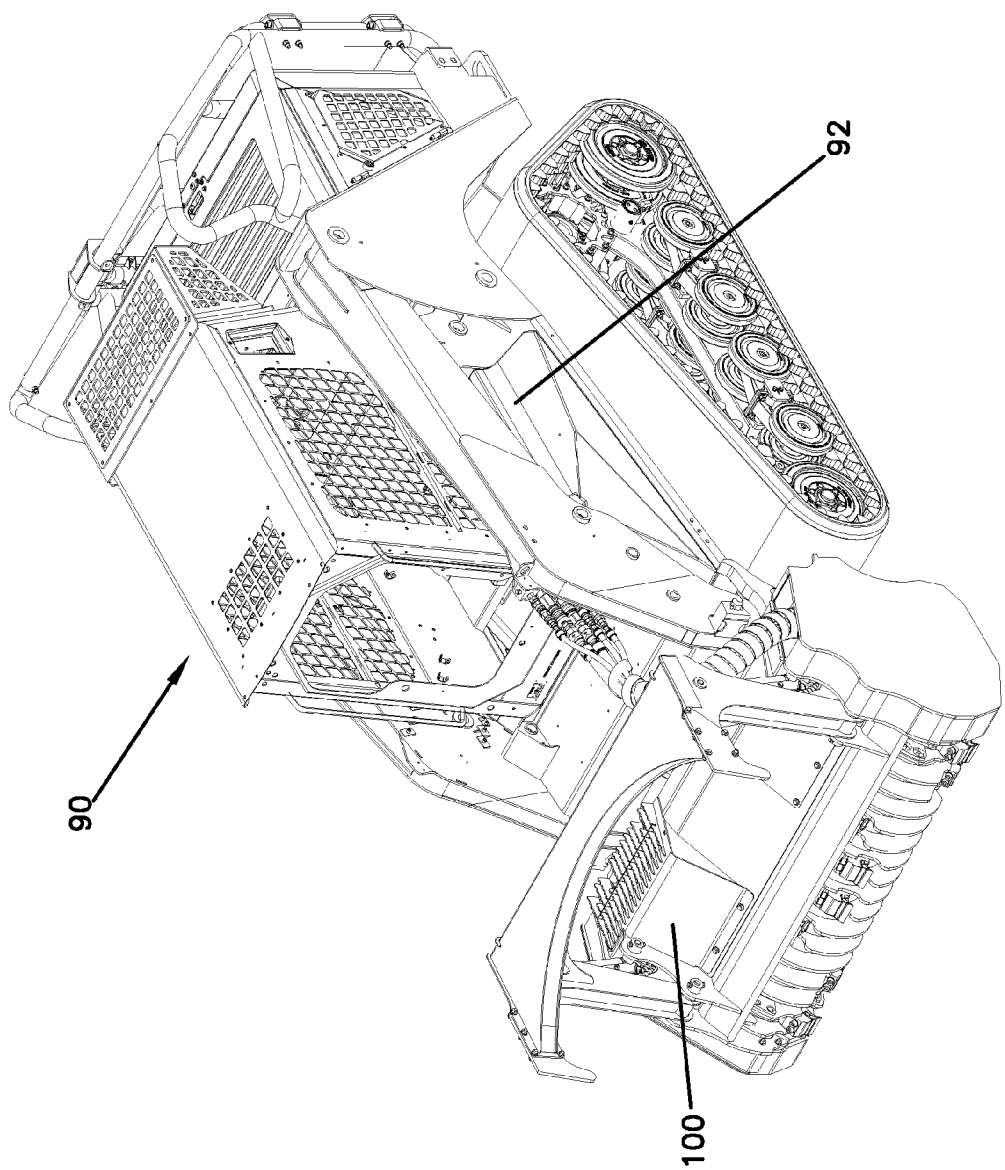
FIG. 1 is a perspective view of an example mulching apparatus.

FIG. 1 is a perspective view of an example mulching apparatus 90. In some embodiments, the mulching apparatus 90 includes a self-propelled vehicle 92 and a cutter head 100.

The self-propelled vehicle 92 operates to drive the mulching apparatus 90. Examples of the self-propelled vehicles include skid-steer loaders, excavators, backhoes, graders, or dedicated prime movers.

The cutter head 100 is releasably attached to a working arm of the self-propelled vehicle 92. An example of the cutter head 100 is illustrated and described with reference to FIG. 2.

Figure 2:
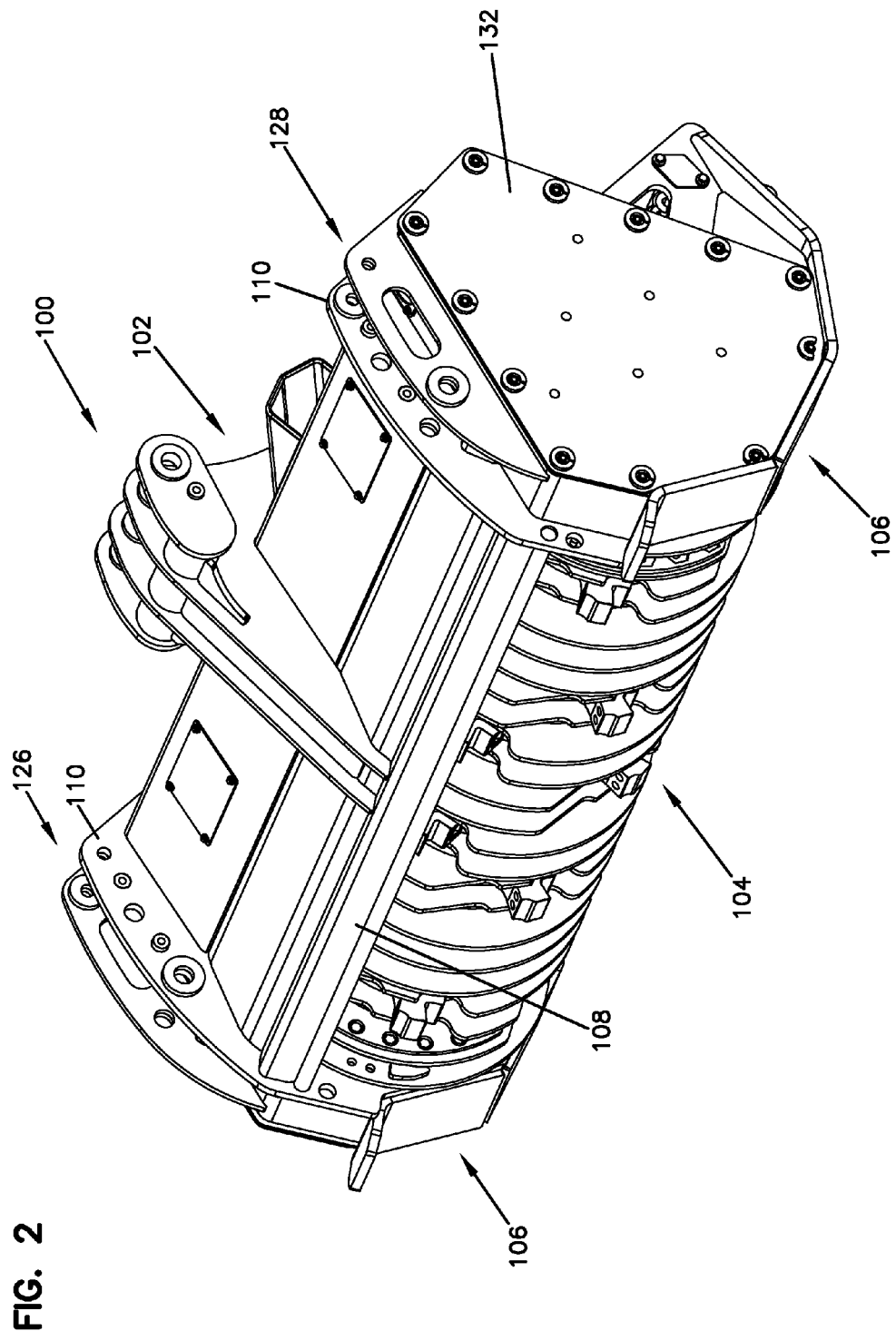
FIG. 2 is a perspective view of an example cutter head.

FIG. 2 is a perspective view of an example cutter head 100. In some embodiments, the cutter head 100 includes a body 102, a rotor assembly 104, and a direct drive system 106.

The cutter head 100 is a rotating head that operates as a cutter. In this example, the cutter head 100 operates as a mulching tool. In other embodiments, the cutter head 100 is used for applications other than mulching, such as a brush cutter head.

The body 102 is configured to at least partially house the rotor assembly 104 and the drive system 106, and is further adapted for being mounted on the self-propelled vehicle 92. In some embodiments, the body 102 includes a shield 108 and side walls 110. The shield 120 covers an upper portion of the rotor assembly 104 (e.g., a drum 112 (FIG. 3)) to contain the deflection of debris outwardly from the cutter head 100 during operation and to increase the cutting of debris to form a mulch of relatively small, uniform size. The side walls 110 form opposite sides 126 and 128 of the body 102 and are configured to cover the rotor assembly 104 at the opposite sides 126 and 128.

The rotor assembly 104 operates to perform cutting or mulching operations. The rotor assembly 104 is partially received within the body 102. An example of the rotor assembly 104 is illustrated and described with reference to FIG. 3.

The drive system 106 is configured to operate the rotor assembly 104. The drive system 106 is configured as a direct drive mechanism, which transfers power from a motor to the rotor assembly 104 without any reductions, such as a gearbox, belts or pulleys. As depicted, the drive system 106 is covered by a side cover 132. When the side cover 132 is removed, the drive system 106 is exposed, as illustrated in FIG. 3.

In some embodiments, as shown in FIG. 2, two drive systems 106 are arranged on the opposite sides 126 and 128 along the longitudinal axis and configured to cooperatively operate the rotor assembly 104. As the two drive systems 106 are identical, only one of the drive systems 106 is illustrated and described herein for brevity purposes. An example of the drive system 106 is illustrated and described with reference to FIGS. 4-14.

Figure 3:
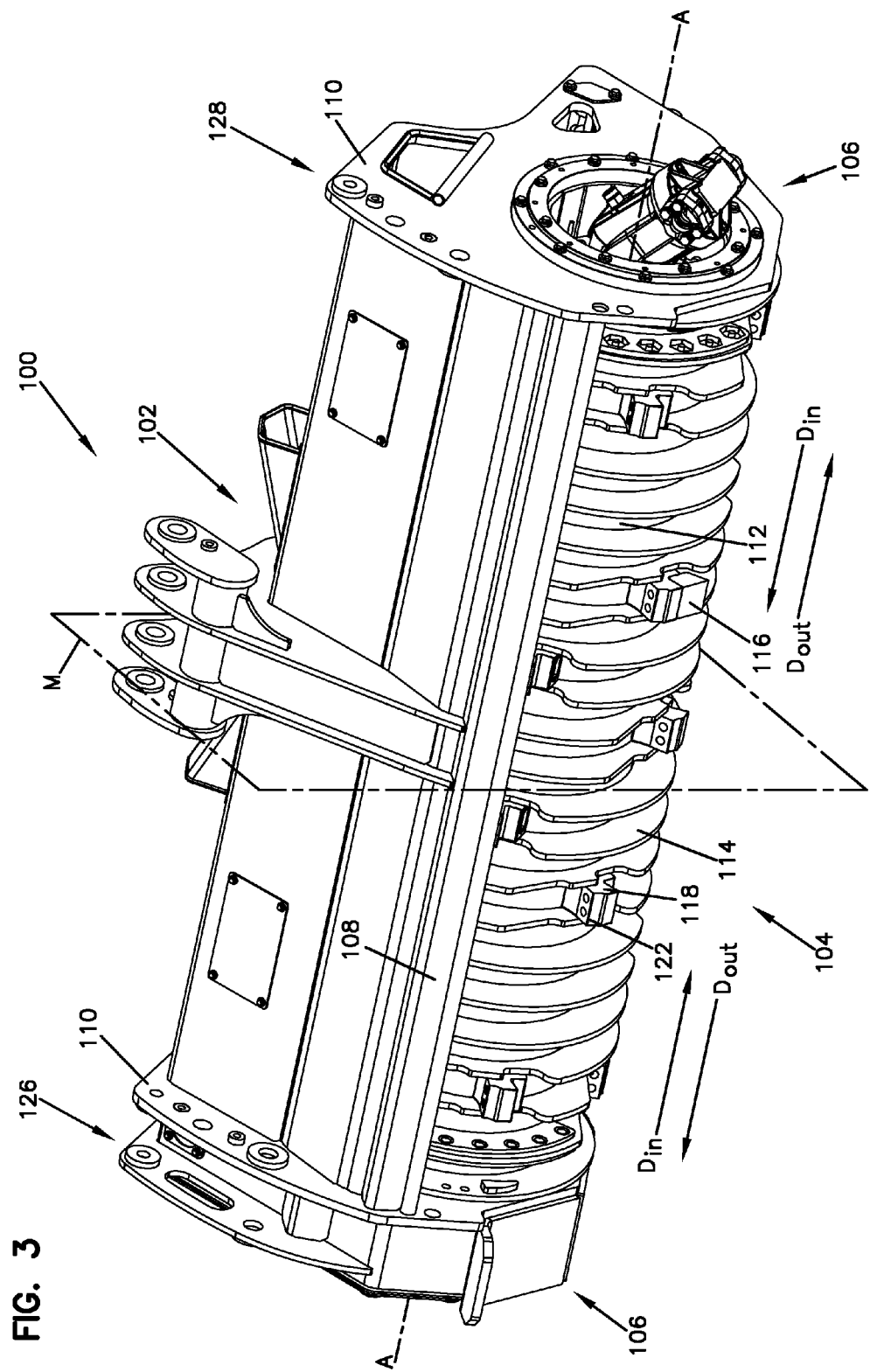
FIG. 3 is a perspective view of an example rotor assembly.

FIG. 3 is a perspective view of an example rotor assembly 104. In some embodiments, the rotor assembly 104 includes a rotational drum 112, a plurality of disks 114, a plurality of cutting teeth 116, and a plurality of mounting blocks 118.

The drum 112 is operated by the drive system 106 to rotate about a longitudinal axis A (FIG. 14). In this example, the drum 112 is configured as a cylindrical shape, and has a hollow or inner bore 230 therein as shown in FIG. 14. The drum 112 is rotatably mounted beneath the shield 108 of the body 102. The drum 112 is also referred to herein as a rotor.

The plurality of disks 114 is attached to the drum 112 and has a plurality of cut-out portions formed along the peripheral edge of the disks 114 to promote removal of materials from the rotor assembly 104.

The plurality of cutting teeth 116 extends from the drum 112 and configured to engage and reduce (e.g., grind, cut, chop, mulch, etc.) trees, bushes, or other materials. In some embodiments, the cutting teeth 116 are arranged on the drum 112 to spiral around the drum 112. This allows only part or even one of the teeth 116 to engage materials at one time which assists in mulching and lessens stresses on the rotor assembly 104. In other embodiments, different teeth arrangements (e.g., lengthwise spacing, circumferential spacing, and number of teeth) may be used for the purpose of the present disclosure.

The plurality of mounting blocks 118 is configured to support the teeth 116. In some embodiments, the teeth 116 are releasably attached to the mounting blocks 118, which are fixed to the drum 112. In some embodiments, each mounting block 118 has two openings 122 formed therein for fastening the cutting tooth 116 thereto. In other embodiments, the teeth 116 are attached to the mounting blocks 118 in different manners. In some embodiments, the mounting blocks 118 are eliminated, and the teeth 116 are attached directly to the drum 112.

To clarify the orientation and geometry of the elements and limitations of the rotor assembly 100, an inboard direction $D_{IN}$ and an outboard direction $D_{OUT}$ are defined along the longitudinal axis A with respect to a mid plane M. The mid plane M is perpendicular to the longitudinal axis A and divides the rotor assembly 100 into two symmetric halves along the longitudinal axis A. The inboard direction $D_{IN}$ is directed to the mid plane M along the longitudinal axis A, and the outboard direction $D_{OUT}$ is opposite to the inboard direction $D_{IN}$ and directed away from the mid plane M along the longitudinal axis A.

Figure 4:
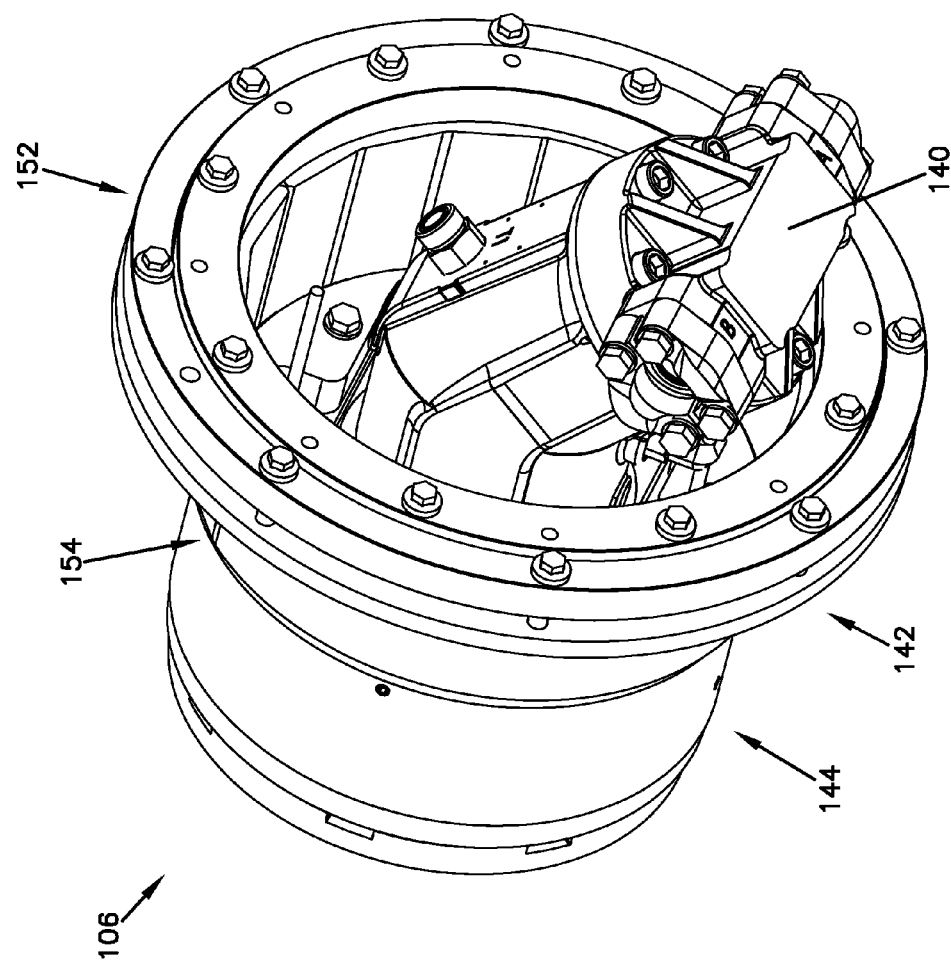
FIG. 4 is a perspective view of an example drive system with a motor assembled.
Figure 5:
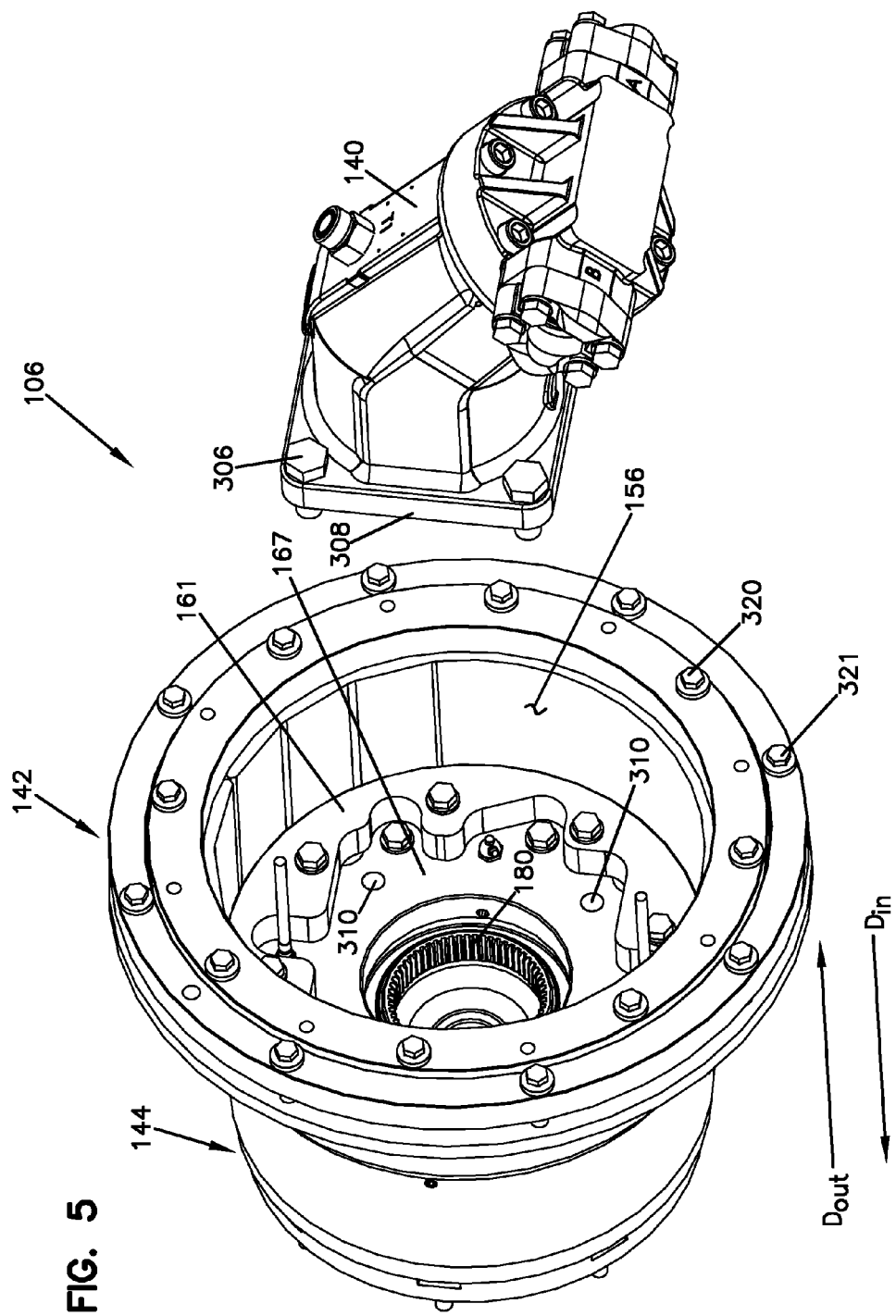
FIG. 5 is a front perspective, partial expanded view of the drive system of FIG. 4 with the motor disassembled.
Figure 6:
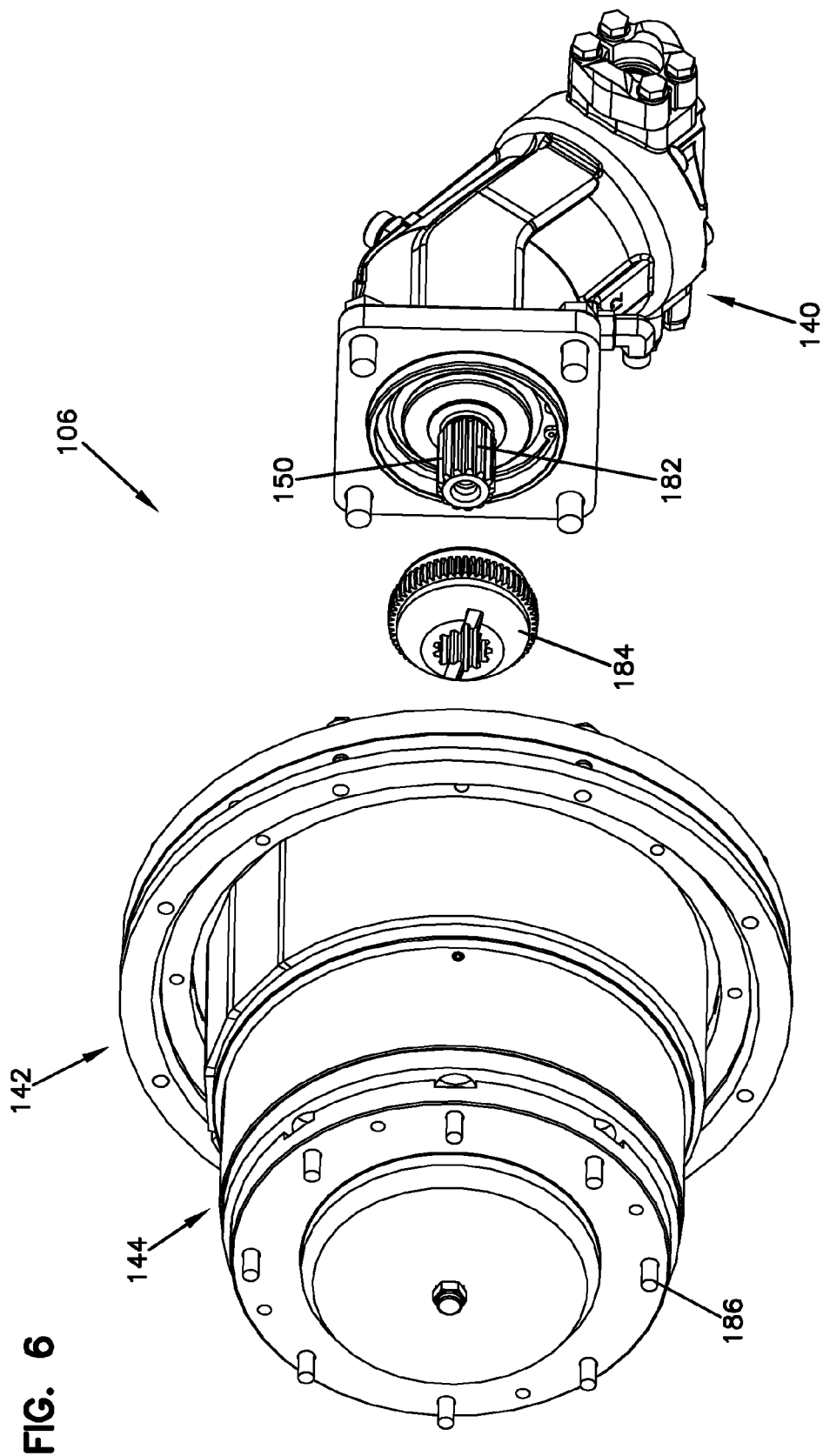
FIG. 6 is a rear perspective, partial expanded view of the drive system of FIG. 4 with the motor disassembled.

FIGS. 4-6 illustrate an example drive system 106. In particular, FIG. 4 is a perspective view of an example drive system 106 with a motor 140 assembled. FIG. 5 is a front perspective, partial exploded view of the drive system 106 of FIG. 4 with the motor 140 disassembled. FIG. 6 is a rear perspective, partial exploded view of the drive system 106 of FIG. 4 with the motor 140 disassembled. The drive system 106 includes a motor 140, a support body 142 and a drive hub assembly 144 including a rotor drive shaft 146.

The motor 140 is provided to operate the rotor assembly 104 through the drive hub assembly 144. In some embodiments, the motor 140 is configured as a hydraulic motor. The motor 140 has a drive shaft 150. As illustrated at FIG. 14, the drive shaft 150 is engaged with the rotor drive shaft 146 of the drive hub assembly 144. In some embodiments, the drive shaft 150 has a spline portion 182 configured to mesh with a complementary spline 180 of the rotor drive shaft 146, as illustrated. In some embodiments, an intermediate gear 184 is provided between the spline portion 182 of the drive shaft 150 and the spline 180 of the rotor drive shaft 146. The intermediate gear 184 can include inner splines that mate with the spline portion 182 and outer splines that mate with splines 180 of the rotor drive shaft 146. In this way, the gear 184 functions as an adaptor.

The support body 142 is configured to at least partially receive the motor 140 and mount the drive hub assembly 144 thereto. As depicted, the support body 142 is generally shaped as a top hat with a cylindrical body 300 and a brim 302 (i.e., a rim, lip, flange, etc.).

The drive hub assembly 144 operates to transfer torque from the motor 140 to the rotor assembly 104. As described below, the drive hub assembly 144 is separate from the support body 142 and preassembled before mounted to the support body 142.

Figure 7:
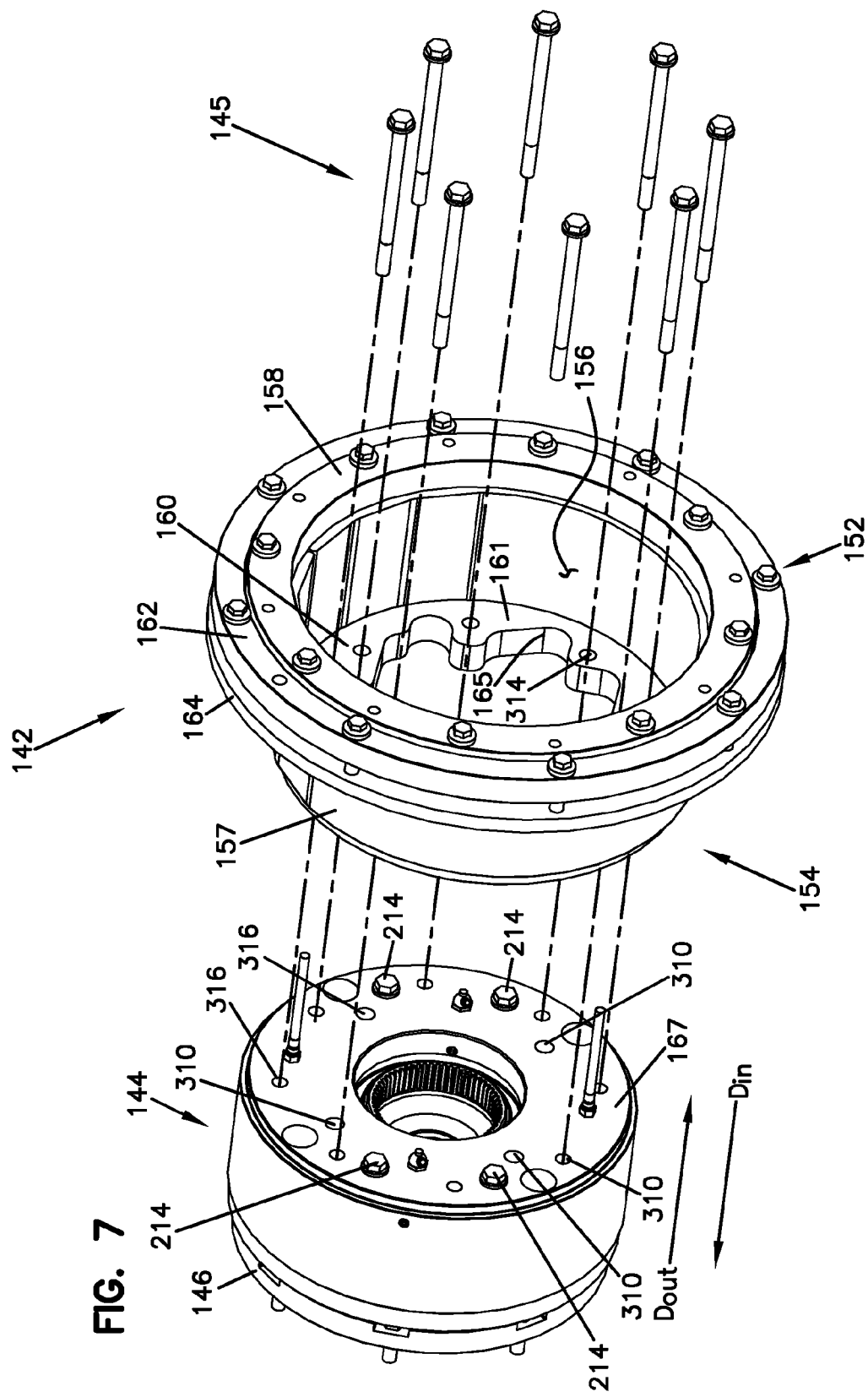
FIG. 7 is a front perspective, partial expanded view of an example support body and an example drive hub assembly.
Figure 8:
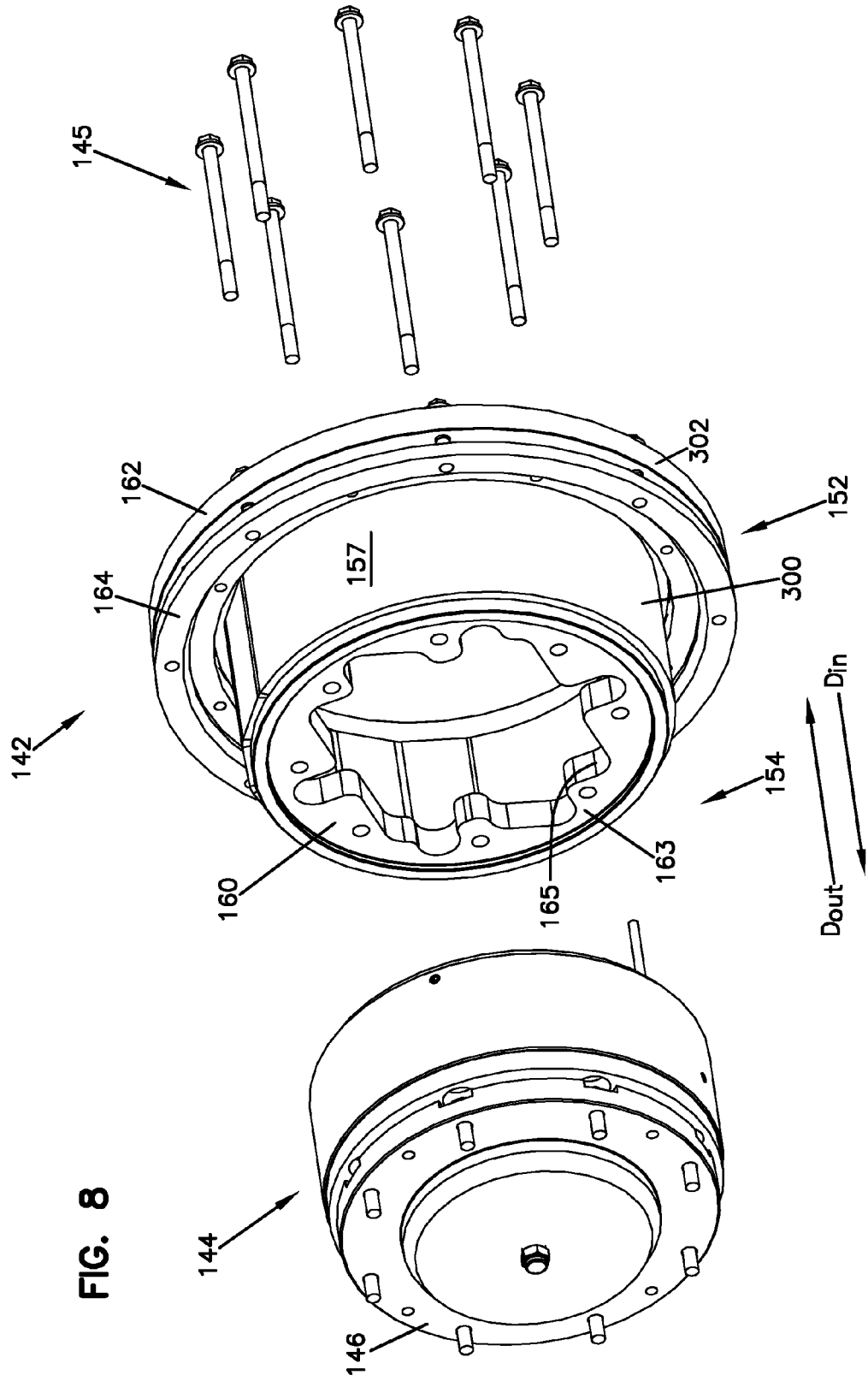
FIG. 8 is a rear perspective, partial expanded view of the support body and the drive hub assembly of FIG. 7.

FIGS. 7 and 8 illustrate an example support body 142 and drive hub assembly 144. In particular, FIG. 7 is a front perspective, partial exploded view of an example support body 142 and drive hub assembly 144. FIG. 8 is a rear perspective, partial exploded view of an example support body 142 and drive hub assembly 144.

As depicted, the support body 142 and the drive hub assembly 144 are modularized independently and assembled together. In some embodiments, the drive hub assembly 144 is mounted onto the support body 142 with fasteners 145. In other embodiments, the drive hub assembly 144 is fixed onto the support body 142 in any suitable manner.

The support body 142 is configured as a cylindrical body extending between a first end 152 and a second end 154 opposite to the first end 152 along a longitudinal axis A (FIG. 13). In some embodiments, the support body 142 includes a cylindrical main wall 157 extending between the first and second ends 152 and 154. The support body 142 includes a hollow 156 defined by the main wall 157 between the first and second ends 152 and 154 and open at the first end 152 and the second end 154. The hollow 156 is configured to at least partially receive the motor 140 from the first end 152. The first end 152 can be referred to as an outboard end and the second end 154 can be referred to as an inboard end.

The support body 142 includes a first flange 158 and a second flange 160. The first flange 158 is arranged at the first end 152, and the second flange 160 is arranged at the second end 154. In some embodiments, the first flange 158 extends radially outwards from a circumference of the first end 152 of the support body 142. In some embodiments, the second flange 160 extends radially inwards from a circumference of the second end 154. The second flange 160 is configured to partially enclose the hollow 156 at the second end 154.

The first flange 158 of the support body 142 operates to mount the support body 142 to the body 102 of the cutter head 100. In some embodiments, the support body 142 is fixed to the body 102 by fastening the first flange 158 to a portion of the body 102. In the depicted example, the support body 142 includes a mounting adaptor plate 162 and a wrap guard ring plate 164, which are used to mount the support body 142 to the body 102 of the cutter head 100. As also illustrated in FIG. 14, the first flange 158 of the support body 142 is fastened to the mounting adaptor plate 162 via fasteners 320. The mounting adaptor plate 162 is then fastened to the wrap guard ring plate 164 via fasteners 321 with a portion of the body 102 interposed therebetween, thereby causing the support body 142 to be fixed to the portion of the body 102. For example, the mounting adaptor plate 162 and the wrap guard ring plate 164 are configured to engage the side wall 110 of the body 102 such that the side wall 110 is clamped therebetween (see FIG. 14). In certain examples, the adaptor plate 162 itself can be considered part of the flange 158. The flange 158 can be directly or indirectly coupled to the body 102.

The second flange 160 of the support body 142 is configured to couple the drive hub assembly 144 thereto. As depicted, the second flange 160 has an outboard side (also referred to herein as an interior surface) 161 and an inboard side (also referred to herein as an exterior surface) 163 opposite to the outboard side 161. The outboard side 161 faces the hollow 156 in the outboard direction $D_{OUT}$ and can be configured to mount the motor 140 thereto within the hollow 156. In other examples, the second flange 160 defines a major central opening 165 that is large enough to allow the motor 140 to pass therethrough and fasten directly to an outboard end face 167 of a bearing housing (e.g., a second end plate or outboard end plate 206) of a bearing assembly 148 of the drive hub assembly 144. As shown in FIGS. 4-6, the motor 140 is inserted into the hollow 156 in the inboard direction $D_{IN}$ and mounted onto the end face 167. For example, fasteners 306 mounted through a flange 308 of the motor 140 are threaded into openings 310 defined in the end face 167. The drive hub assembly 144 is configured to be mounted to the inboard side or exterior surface 163 of the second flange 160. As shown in FIGS. 7 and 8, the drive hub assembly 144 is engaged onto the inboard side or exterior surface 163 of the second flange 160 in the outboard direction $D_{OUT}$.

As such, the drive hub assembly 144 is mounted onto the second end 154 (i.e., the inboard side or exterior surface 163 of the second flange 160) opposite to the first end 152 of the support body 142. Therefore, the drive hub assembly 144 may be first assembled, independently from the support body 142, before the drive hub assembly 144 is coupled to the support body 142 to produce the drive system 106.

Figure 9:
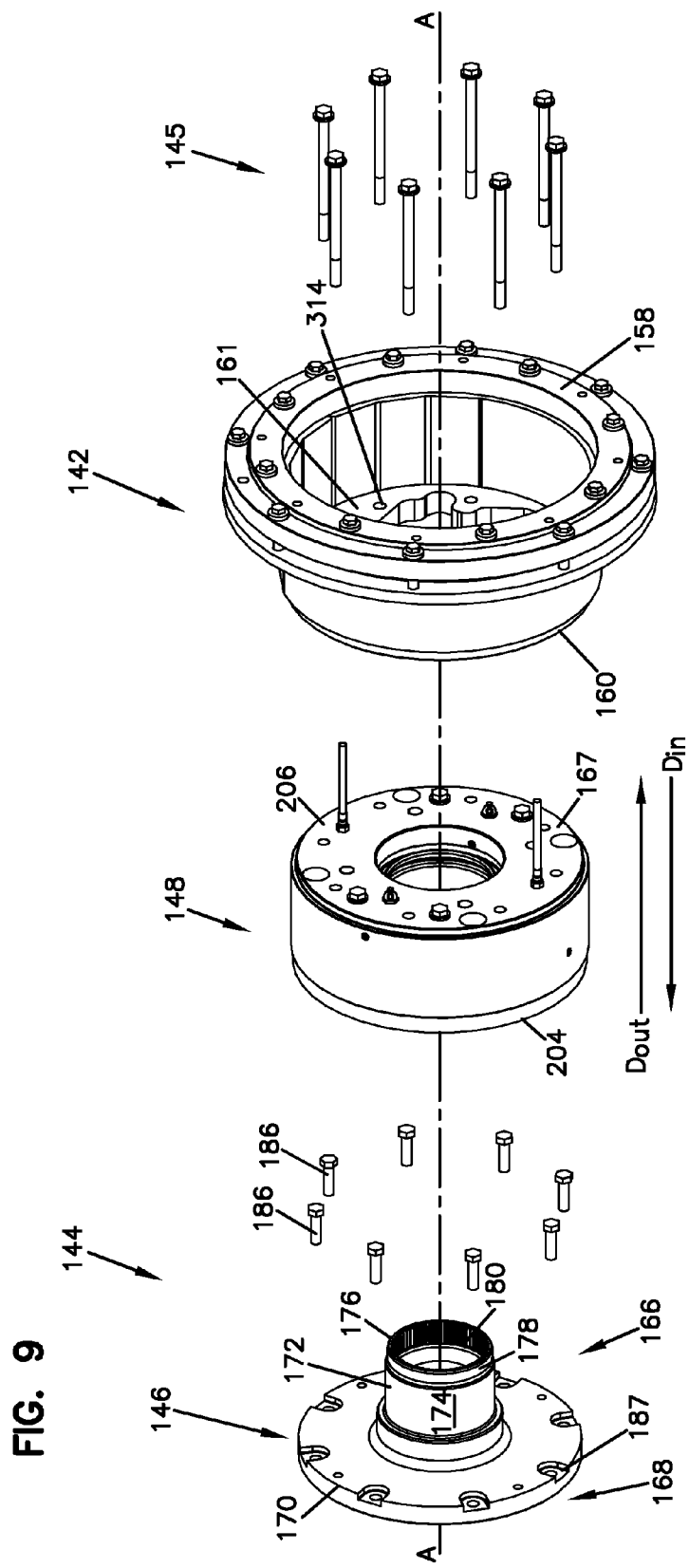
FIG. 9 includes a front perspective, partial expanded view of an example drive hub assembly.
Figure 10:
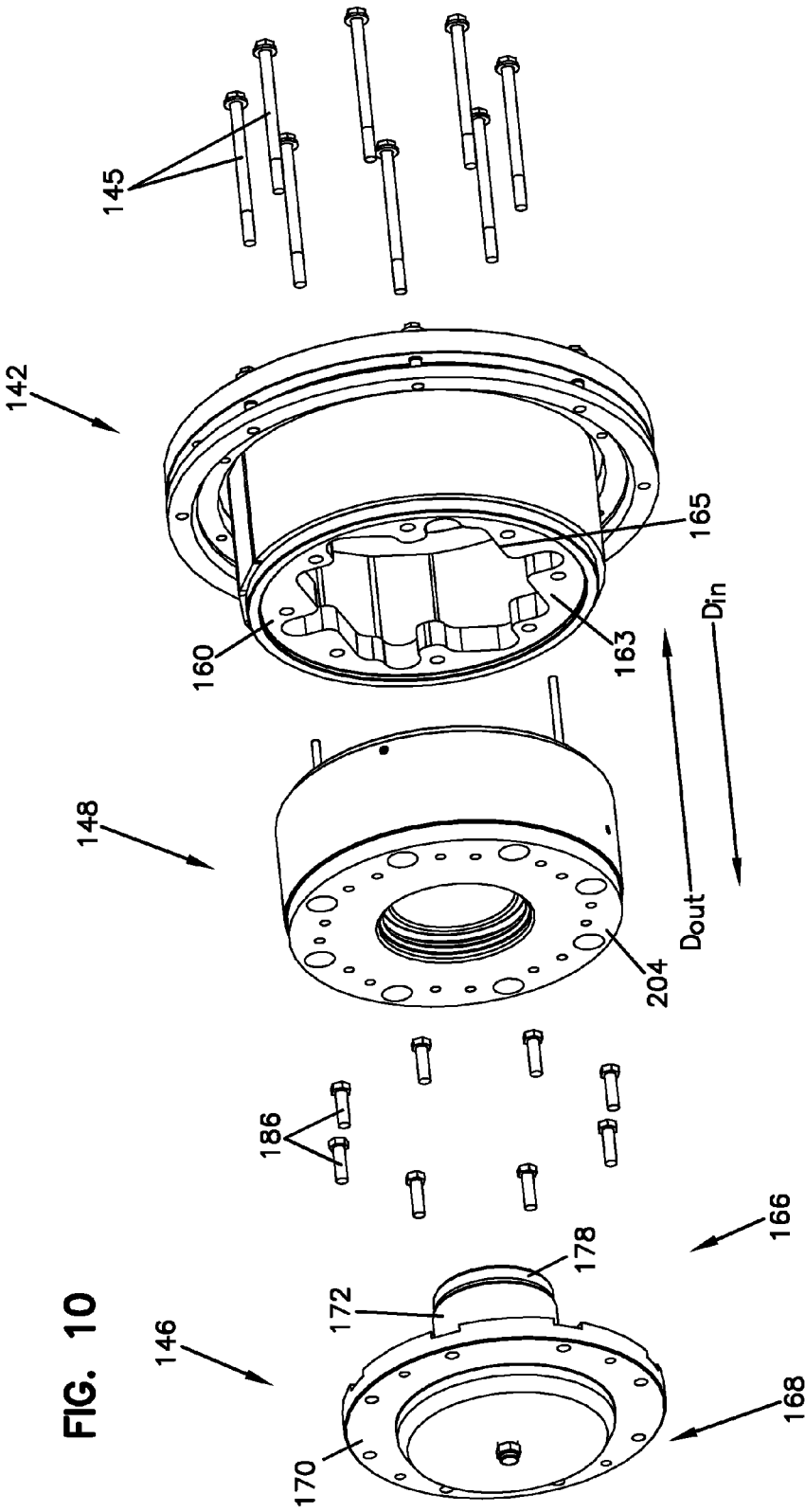
FIG. 10 includes a rear perspective, partial expanded view of the drive hub assembly of FIG. 9.

FIGS. 9 and 10 illustrate an example drive hub assembly 144. In particular, FIG. 9 includes a front perspective, partial expanded view of an example drive hub assembly 144. FIG. 10 includes a rear perspective, partial expanded view of the drive hub assembly 144 of FIG. 9. In some embodiments, the drive hub assembly 144 includes a rotor drive shaft 146 and a bearing assembly 148.

As described above, the drive hub assembly 144 is connected between the support body 142 and the rotor assembly 104 (e.g., the rotational drum 112), and rotatably supports the rotor assembly 104 relative to the support body 142.

The rotor drive shaft 146 is rotatably supported by the bearing assembly 148. The rotor drive shaft 146 is configured to interface with the drive shaft 150 of the motor 140 at a driven end 166 and mounted to the rotatable drum 112 of the rotor assembly 104 at a driving end 168. In some embodiments, the rotor drive shaft 146 includes a rotor support flange 170 and a shaft portion 172.

The rotor support flange 170 extends radially outwards at the driving end 168. As shown at FIG. 14, the rotor support flange 170 is coupled to the rotor assembly 104 so that the rotor assembly 104 rotates as the rotor drive shaft 146 is driven by the motor 140. In some embodiments, the rotor support flange 170 is mounted to the rotor assembly 104 with fasteners 186 that extend through openings 187 in the flange 170.

The shaft portion 172 extends from the rotor support flange 170 to the driven end 166 along the longitudinal axis A. The shaft portion 172 has an outer shaft surface 174 and an inner shaft bore 176. In some embodiments, the shaft portion 172 includes a retention groove 178 circumferentially formed thereon adjacent the driven end 166. As described below, the retention groove 178 is configured to engage a retention element (e.g., a snap ring, retention ring or a sealing/retention element such as member 224 (FIG.

12)) to retain the shaft portion 172 within the bearing assembly 148. The inner shaft bore 176 is configured to engage the drive shaft 150 of the motor 140 therein. In some embodiments, the inner shaft bore 176 includes a spline 180 formed thereon, which engages the spline portion 182 of the drive shaft 150 of the motor 140, either directly or via the intermediate gear 184.

The bearing assembly 148 is configured to rotatably support the rotor drive shaft 146. The bearing assembly 148 is mounted onto the second flange 160 (i.e., the inboard side or exterior surface 163 thereof) of the support body 142. As depicted, the bearing assembly 148 is assembled onto the top surface (i.e., the exterior surface or inboard side 163 of the second flange 160) of the support body 142 having a top hat shape. In some embodiments, the fasteners 145 are used to couple the bearing assembly 148 onto the second flange 160 of the support body 142. The fasteners 145 can extend through openings 314 in the flange 160 and can thread into openings 316 defined in the end face 167 of a housing of the bearing assembly 148. An example bearing assembly 148 is illustrated and described in more detail with reference to FIGS. 11 and 12.

Figure 11:
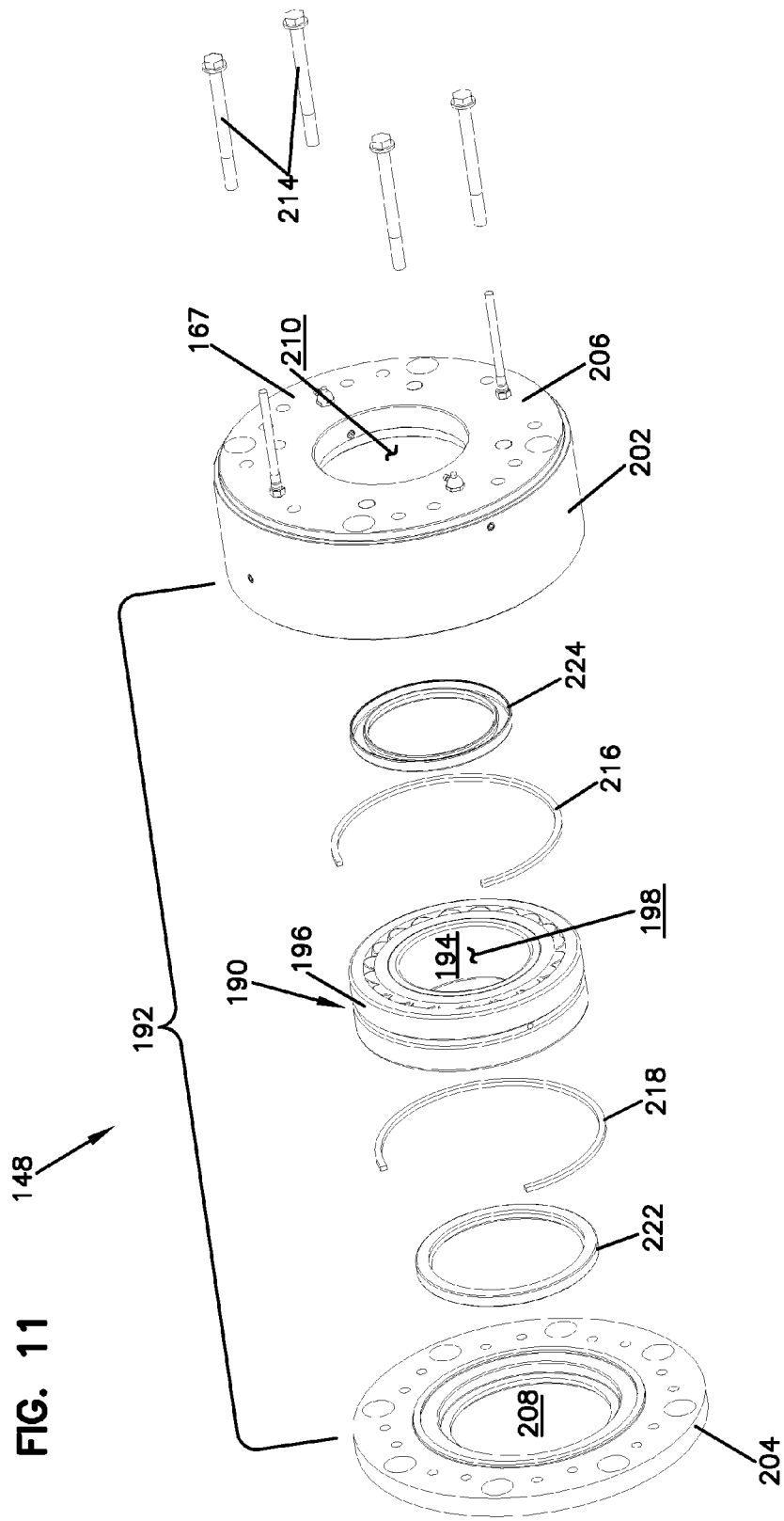
FIG. 11 is a front perspective, exploded view of an example bearing assembly.
Figure 12:
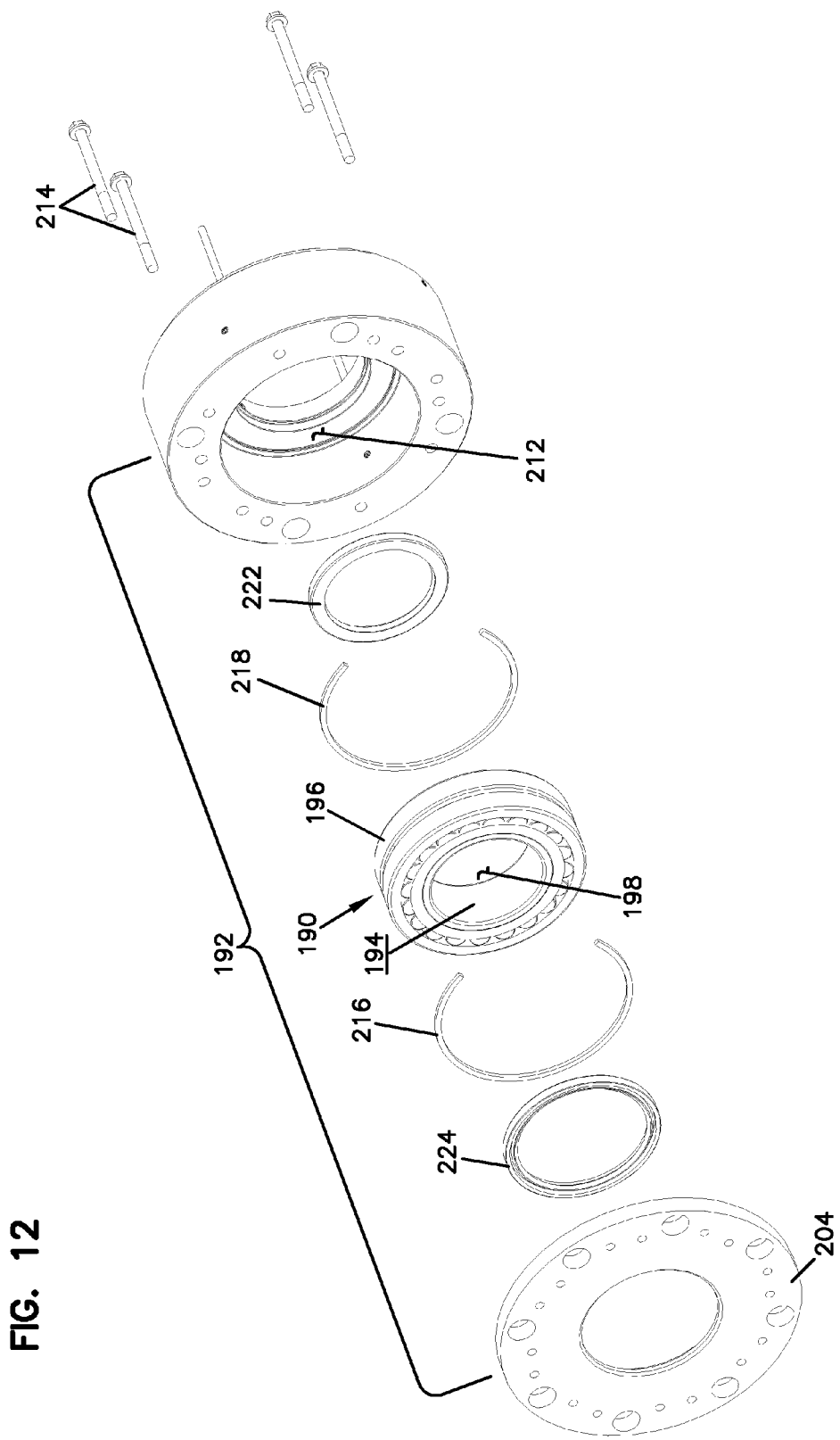
FIG. 12 is a rear perspective, exploded view of the bearing assembly of FIG. 11.

FIGS. 11 and 12 illustrate an example bearing assembly 148. FIG. 11 is a front perspective, exploded view of an example bearing assembly 148. FIG. 12 is a rear perspective, exploded view of the bearing assembly 148 of FIG. 11. In some embodiments, the bearing assembly 148 includes a drive bearing 190 and a bearing housing 192.

The drive bearing 190 has an inner race 194 and an outer race 196, which rotate relative to each other. The inner race 194 defines a bearing bore 198. In some embodiments, the drive bearing 190 is configured as a ball bearing.

The bearing housing 192 is configured to contain the drive bearing 190. The bearing housing 192 is also configured to be attached onto the inboard side or exterior surface 163 of the second flange 160 of the support body 142 so that the drive hub assembly 144 is fixed to the support body 142 (e.g., by fasteners 145).

The bearing housing 192 has a bearing receiving body 202, a first end plate 204 (e.g., an inboard end plate), and a second end plate 206 (e.g., an outboard end plate). The bearing receiving body 202 is configured to receive and engage an outer race 196 of a drive bearing 190. The first and second end plates 204 and 206 are arranged at opposite sides of the bearing receiving body 202 along the longitudinal axis A, and have openings 208 and 210, respectively, which correspond to the bearing bore 198 of the drive bearing 190. The first and second end plates 204 and 206 are connected or mounted to the opposite sides of the bearing receiving body 202 to sealingly contain the drive bearing 190 within the bearing receiving body 202. In some embodiments, the second end plate 206 is integrally formed with the bearing receiving body 202 as a single piece, and the first end plate 204 operates as a cover plate configured to be coupled to the bearing receiving body 202 to enclose the bearing receiving body 202, as illustrated in FIGS. 11 and 12. In other embodiments, the first end plate 204 is integrally formed with the bearing receiving body 202 as a single piece. In yet other embodiments, the first and second end plates 204 and 206 are all independently made and coupled to the opposite sides of the bearing receiving body 202.

As shown in FIG. 12, the bearing receiving body 202 includes a bearing receptacle 212 configured to receive and engage the outer race 196 of the drive bearing 190. In some embodiments, the outer race 196 of the drive bearing 190 is engaged within the bearing receptacle 212 by interference-fit. For example, the outer race 196 of the drive bearing 190 is press-fitted to the receptacle 212. In other embodiments, the outer race 196 of the drive bearing 190 is slip-fitted to the bearing receptacle 212 with a snap ring. In some embodiments, a spacer 216 is placed between the receptacle 212 and the drive bearing 190. After the drive bearing 190 is inserted into the receptacle 212, the first end plate 204 (i.e., the cover plate) is coupled to the bearing receiving body 202 to cover the receptacle 212. In some embodiments, the first end plate 204 is mounted to the bearing receiving body 202 with fasteners 214. The fasteners 214 extend through the bearing receiving body 202 and thread into tapped openings defined by the end plate 204. Heads of the fasteners 214 seat against the outboard end face 167 of the bearing assembly 148 (see FIG. 7). The end face 167 is defined by the outboard end plate 206 of the bearing housing 192. In some embodiments, a spacer 218 is placed between the first end plate 204 and the drive bearing 190.

As depicted, the second end plate 206 is mounted onto the inboard side or exterior surface 163 of the second flange 160 of the support body 142. In some embodiments, the fasteners 145 are used to couple the second end plate 206 onto the second flange 160 of the support body 142.

The bearing assembly 148 includes one or more sealing members 222 and 224 to seal off a bearing lubricant applied within the receptacle 212 of the bearing receiving body 202 to lubricate the drive bearing 190. In some embodiments, the sealing members 222 and 224 are sealing rings. For example, a first sealing member 222 is engaged between the first end plate 204 and the drive bearing 190 and arranged around the inner race 194 of the drive bearing 190. A second sealing member 224 is inserted into the receptacle 212 and engaged between the bearing receiving body 202 and the drive bearing 190, and arranged around the inner race 194 of the drive bearing 190. As described below, in some embodiments, the second sealing member 224 also operates as a retention element as described in FIG. 14.

FIG. 13 is an exploded view of the entire support body 142 and drive hub assembly 144 of FIGS. 7-12. The descriptions for the support body 142 and the drive hub assembly 144 are omitted for brevity purposes.

FIG. 14 is a cross-sectional view of the drive system 106 of FIGS. 4-12 with the rotor assembly 104 assembled. As many features of the elements illustrated in FIG. 14 have been described above, the descriptions for such features are not repeated herein. The following description will be limited primarily to features that are not fully described and illustrated above.

As described, the rotor assembly 104 includes the rotational drum 112. In some embodiments, the rotational drum 112 has an inner bore 230 and an inner drive flange 232. In some embodiments, the inner bore 230 receives at least partially the drive system 106. In some embodiments, the inner drive flange 232 extends circumferentially inwards from an inner surface 234 of the inner bore 230.

In some embodiments, the rotor support flange 170 is coupled to the inner drive flange 232 of the drum 112. As depicted, the fasteners 186 are used to fix the rotor support flange 170 to the inner drive flange 232.

The shaft portion 172 of the rotor drive shaft 146 includes the outer shaft surface 174 and the inner shaft bore 176. The outer shaft surface 174 is configured to engage the inner race 194 of the drive bearing 190. In some embodiments, the outer shaft surface 174 is engaged with the inner race 194 of the drive bearing 190 in interference-fit. For example, the inner race 194 of the drive bearing 190 is press-fitted to the outer shaft surface 174 of the shaft portion 172. In other embodiments, the inner race 194 of the drive bearing 190 is slip-fitted to the outer shaft surface 174 with a snap ring. In yet other embodiments, as described above, the outer shaft surface 174 of the shaft portion 172 has the retention groove 178 circumferentially formed adjacent the driven end 166. The retention groove 178 is configured to receive the retention element, such as a snap ring or retaining ring. The retention element operates to retain the inner race 194 of the drive bearing 190 onto the outer shaft surface 174 of the shaft portion 172. In the depicted example, the second sealing member 224 operates as the retention element, as well as the sealing element as described above.

The inner shaft bore 176 of the shaft portion 172 is configured to engage the drive shaft 150 of the motor 140. In the depicted example, the inner shaft bore 176 engages the drive shaft 150 with the intermediate gear 184 interposed therebetween. In other embodiments, the inner shaft bore 176 is directly engaged with the drive shaft 150 of the motor 140.

The drive system 106 allows preassembling the drive hub assembly 144 independently from the support body 142. Once the drive hub assembly 144 is assembled, the drive hub assembly 144 is mounted onto one end of the support body 142, and the motor 140 is inserted into the support body 142 from the other end of the support body 142, to produce the drive system 106.

In some embodiments, the shaft portion 172 of the rotor drive shaft 146 is engaged with the bearing assembly 148 (e.g., the inner race 194 of the drive bearing 190) to rotatably support the rotor drive shaft 146 with the bearing assembly 148. Then, the bearing assembly 148 is mounted onto the second end 154 (e.g., the second flange 160) of the support body 142. After that, the rotor support portion (e.g., the rotor support flange 170) of the rotor drive shaft 146 is mounted to the rotor assembly 104 (e.g., the inner drive flange 232 of the drum 112). Then, the first end 152 (e.g., the first flange 158) of the support body 142 is mounted to the body 102 (e.g., the side wall 110). In some embodiments, the mounting adaptor plate 162 and the wrap guard ring plate 164 are used to mount the first end 152 of the support body 142 to the body 102. Finally, the motor 140 is inserted into the support body 142 through the first end 152 to couple the drive shaft 150 with the shaft portion 172 (e.g., the inner shaft bore 176) of the rotor drive shaft 146.

The support body 142 and the drive hub assembly 144 are configured to be separable and arranged exterior of one another. This separation simplifies the entire assembly process of the drive system 106, improves the reliability of the drive system 106 and reduces the manufacturing cost. Further, the drive system 106 according to the present disclosure absorbs misalignment between the axis of rotation of the rotor assembly 104 (e.g., the drum 112) and the axis of rotation of the motor 140 rather than the short drive shaft, as shown.

Although the drive system 106 is herein illustrated and described primarily for the application of the cutter head 100, the principles and features of the drive system 106 according to the present disclosure are similarly applicable to any other types of drive systems for driving rotors or rotating members.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

LIST OF REFERENCE NUMERALS AND CORRESPONDING FEATURES 90 mulching apparatus
92 self-propelled vehicle
100 cutter head
102 body
104 rotor assembly
106 direct drive system
108 shield
110 side wall
112 drum
114 disks
116 cutting tooth
118 mounting block
120 shield
122 two openings
126 sides
128 sides
132 side cover
138 bearing assembly
140 motor
141 rotor drive shaft
142 support body
144 drive hub assembly
145 fasteners
146 rotor drive shaft
148 bearing assembly
150 drive shaft
152 first end
154 second end
156 hollow
157 a cylindrical main wall
158 first flange
160 second flange
161 outboard side (interior surface) of second flange
162 mounting adaptor plate
163 inboard side (exterior surface) of second flange
164 wrap guard ring plate
165 major central opening
166 driven end
167 outboard end face
168 driving end
170 rotor support flange
172 shaft portion
174 outer shaft surface
176 inner shaft bore
178 retention groove
180 spline
182 spline portion
184 intermediate gear
186 fasteners
187 openings
190 drive bearing
192 bearing housing
194 inner race
196 outer race
198 bearing bore
202 bearing receiving body
204 first end plate
206 second end plate
208 openings
210 openings
212 bearing receptacle
214 fasteners
216 spacer
218 spacer 222 first sealing member
224 second sealing member
230 inner bore
232 inner drive flange
234 inner surface
300 cylindrical body
302 brim
306 fasteners
308 flange
310 openings
314 openings
316 openings
320 fasteners
321 fasteners

What is claimed is:

1. A drive system (106) for rotationally driving a rotor (104) relative to a main body (102), the drive system (106) comprising:
 a support body (142) extending between first and second ends (152, 154), the first end (152) configured to be mounted to the main body (102), and the second end (154) having an interior surface (161) and an exterior surface (163);
 a rotor drive shaft (146) including a rotor support portion (170) and a shaft portion (172), the rotor support portion (170) configured to be coupled to the rotor (104), and the shaft portion (172) configured to be driven by a drive shaft (150) of a motor (140); and
 a bearing assembly (148) mounted onto the exterior surface (163) of the second end (154) of the support body (142) and rotatably supporting the shaft portion (172) of the rotor drive shaft (146),
 wherein the motor (140) is positioned at least partially within an interior of the support body (142).

2. The drive system (106) of claim 1, wherein the support body (142) comprises:
 a cylindrical main wall (157) extending between the first and second ends (152, 154);
 a first flange (158) at the first end (152), the first flange (158) configured to be mounted to the main body (102);
 a second flange (160) at the second end (154), the second flange (160) having the interior surface (161) and the exterior surface (163), wherein the exterior surface (163) is configured to engage the bearing assembly (148); and
 a hollow (156) open to the first and second ends (152, 154) and defining the interior of the support body (142), the hollow (156) configured to receive the motor (140) from the first end (152),
 wherein the interior surface (161) of the second flange (160) faces the hollow (156), and
 wherein the second flange (160) defines an opening (165) through which at least a portion of the motor extends.

3. The drive system (106) of claim 1, wherein the first flange extends (158) radially outwards from a circumference of the first end (152) of the support body (142), and
 wherein the second flange (160) extends radially inwards from a circumference of the second end (154) of the support body (142).

4. The drive system (106) of claim 1, wherein the bearing assembly (148) comprises a drive bearing (190) and a bearing housing (192), the bearing housing (192) containing the drive bearing (190) and mounted onto the exterior surface (163) of the second end (154) of the support body (142), and the drive bearing (190) engaging the shaft portion (172) of the rotor drive shaft (146).

5. The drive system (106) of claim 4, wherein the drive bearing (190) has an inner race (194) and an outer race (196), the inner race (194) engaging the shaft portion (172) of the rotor drive shaft (146), and the outer race (196) fitted into the bearing housing (192), wherein the drive bearing (190) allows the shaft portion (172) to rotate relative to the bearing housing (192) which is fixed to the support body (142).

6. The drive system (106) of claim 5, wherein the shaft portion (172) of the rotor drive shaft (146) has an outer shaft surface (174) and an inner shaft bore (176), the outer shaft surface (174) supported by the inner race (194) of the drive bearing (190), and the inner shaft bore (176) being coupled to the drive shaft (150) of the motor (140).

7. The drive system of claim 4, wherein the bearing housing (192) comprises:
 a bearing receiving body (202) configured to engage the drive bearing (190); and
 first and second end plates (204, 206) sealingly containing the drive bearing (190) within the bearing receiving body (202),
 wherein the second end plate (206) coupled onto the second end (154) of the support body (142).

8. The drive system of claim 7, wherein the bearing receiving body (202) and the second end plate (206) are integrally formed as a single piece.

9. The drive system of claim 1, wherein the motor (140) mounts to an end face (167) of the bearing assembly (148), the end face (167) at least partially abutting the exterior surface (163) of the supporting body (142).

10. The drive system of claim 7, wherein the bearing housing (192) further comprises first and second sealing rings (222, 224), the first sealing ring (222) engaged between the drive bearing (190) and the first end plate (204), and the second sealing ring (224) engaged between the drive bearing (190) and the second end plate (206).

11. A cutter head system (100) comprising:
 a body (102);
 a rotor assembly (104) at least partially received in the body; and
 a drive system (106) configured to rotationally support and drive the rotor assembly, the drive system comprising:
  a motor (140) having a drive shaft (150);
  a support body (142) extending between first and second ends (152, 154), the first end (152) mounted to the body (102), and the second end (154) having an interior surface (161) and an exterior surface (163);
  a rotor drive shaft (146) including a rotor support portion and a shaft portion (172), the rotor support portion coupled to the rotor assembly, and the shaft portion (172) configured to be driven by the drive shaft (150) of the motor (140); and
  a bearing assembly (148) including a bearing receiving body (202), a first end plate (204), and a second end plate (206), the second end plate (206) integrally formed with the bearing receiving body (202) and defining an outboard end face (167), the first end plate (204) being mounted to the bearing receiving body (202) opposite to the second end plate (206) via a plurality of first threaded fasteners (214), the threaded fasteners (214) being seated against the outboard end face (167) of the second end plate (204), the bearing assembly (148) further being mounted onto the exterior surface (163) of the second end (154) of the support body (142) via a plurality of second threaded fasteners (145) such that the outboard end face (167) of the second end plate (206) at least partially abuts the exterior surface (163) of the second end (154) of the support body (142), the second threaded fasteners (145) extending through the exterior surface (163) of the second end (154) of the support body (142) and into the outboard end face (167) of the second end plate (204), the bearing assembly (148) rotatably supporting the shaft portion (172) of the rotor drive shaft (146).

12. The cutter head system (100) of claim 11, wherein the support body (142) comprises:
   a cylindrical main wall (157) extending between the first and second ends (152, 154);
   a first flange (158) at the first end (152), the first flange (158) extending radially outwards from a circumference of the first end (152) of the support body (142) and configured to be mounted to the body (102);
   a second flange (160) at the second end (154), the second flange (160) extending radially inwards from a circumference of the second end (154) of the support body (142) and having the interior surface (161) and the exterior surface (163), wherein the exterior surface (163) is configured to engage the bearing assembly (148); and
   a hollow (156) open to the first and second ends (152, 154) and defining the interior of the support body (142), the hollow (156) configured to receive the motor (140) from the first end (152),
   wherein the interior surface (161) of the second flange (160) faces the hollow (156), and
   wherein the second flange (160) defines an opening (165) through which at least a portion of the motor extends.

13. The cutter head system (100) of claim 11, wherein the motor (140) includes a flange (308), the flange (308) configured to abut the outboard end face (167) of the second end plate (204) and mounted onto the outboard end face (167) of the second end plate (204) via a plurality of motor fasteners (306), the motor fasteners (306) extending through flange (308) of the motor (140) and into the outboard end face (167) of the second end plate (204).

14. The cutter head system (100) of claim 10, wherein the bearing assembly (148) comprises a drive bearing (190) and a bearing housing (192), the bearing housing (192) containing the drive bearing (190) and mounted onto the exterior surface (163) of the second end (154) of the support body (142), and the drive bearing (190) engaging the shaft portion (172) of the rotor drive shaft (146).

15. A drive system (106) for rotationally driving a rotor (104) relative to a main body (102), wherein the rotor (104) has an inner bore (230) configured to at least partially receive the drive system therein and has an inner drive flange (232) circumferentially extending from an inner surface (234) of the inner bore (230), the drive system (106) comprising:
   a motor (140) having a drive shaft (150);
   a support body (142) comprising:
      a cylindrical main wall (157) extending between a first end (152) and a second end (154) opposite to the first end (152) along a longitudinal axis A, wherein the main wall (157) defines an interior hollow (156) within the main wall (157);
      a first flange (158) at the first end (152), the first flange (158) extending radially outwardly from the first end (152) and configured to be mounted to the main body; and
      a second flange (160) at the second end (154), the second flange (160) extending radially inwardly from the second end (154) and partially enclosing the hollow (156) at the second end (154), wherein the second flange (160) has an outboard side (161) facing the hollow (156) and an inboard side (163) opposite to the outboard side (161);
   wherein the motor (140) mounts so as to be positioned at least partially within the hollow (156), and
   a drive hub assembly (144) comprising:
      a bearing assembly (148) including a drive bearing (190) and a bearing housing (192), wherein the drive bearing (190) has an inner race (194) and an outer race (196), and wherein the bearing housing (192) contains the drive bearing (190) and is mounted to the inboard side (163) of the second flange (160) of the support body (142); and
      a rotor drive shaft (146) including a rotor support flange (170) and a shaft portion (172), wherein the rotor support flange (170) is coupled to the inner drive flange (232) of the rotor (104), and wherein the shaft portion (172) has an outer shaft surface (174) and an inner shaft bore (176), the outer shaft surface (174) supported by the inner race (194) of the drive bearing (190), and the inner shaft bore (176) coupled to the drive shaft of the motor (140).

16. The drive system of claim 15, wherein the bearing housing (192) comprises:
   a bearing receiving body (202) configured to engage the outer race (196) of the drive bearing (190); and
   first and second end plates (204, 206) sealingly containing the drive bearing (190) within the bearing receiving body (202),
   wherein the second end plate (206) coupled onto the second flange (160) of the support body (142).

17. The drive system of 16, wherein the bearing receiving body (202) and the second end plate (206) are integrally formed as one piece.

18. The drive system of claim 16, wherein the motor (140) mounts to an end face (167) of the bearing assembly (148), the end face (167) at least partially abutting the inboard side (163) of the supporting body (142).

19. The drive system of 16, wherein the bearing housing (192) further comprises first and second sealing rings (222, 224), the first sealing ring (222) engaged between the drive bearing (190) and the first end plate (204), and the second sealing ring (224) engaged between the drive bearing (190) and the second end plate (206).

20. The drive system of 15, wherein the shaft portion (172) of the rotor drive shaft (146) has a retention groove (178) formed on the outer shaft surface (174), and
   wherein the drive hub assembly includes a retention element (224) configured to be inserted into the retention groove (178) of the shaft portion (172) of the rotor drive shaft (146) to retain the inner race (194) of the drive bearing (190) onto the shaft portion (172) of the rotor drive shaft (146).

* * * * *